(12) United States Patent
Reinecke et al.

(10) Patent No.: US 10,064,337 B2
(45) Date of Patent: Sep. 4, 2018

(54) GRAIN PAN AND SIEVE DIVIDERS

(71) Applicant: CNH Industrial America LLC, New Holland, PA (US)

(72) Inventors: Clay A. Reinecke, Blue Grass, IA (US); Craig E. Murray, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/240,001

(22) Filed: Aug. 18, 2016

(65) Prior Publication Data

US 2017/0055456 A1    Mar. 2, 2017

Related U.S. Application Data

(60) Provisional application No. 62/211,394, filed on Aug. 28, 2015.

(51) Int. Cl.
| | |
|---|---|
| *A01F 12/32* | (2006.01) |
| *B07B 1/00* | (2006.01) |
| *A01F 12/44* | (2006.01) |
| *A01D 75/28* | (2006.01) |
| *A01F 7/06* | (2006.01) |
| *A01F 12/46* | (2006.01) |

(52) U.S. Cl.
CPC .......... *A01F 12/446* (2013.01); *A01D 75/282* (2013.01); *A01F 7/06* (2013.01); *A01F 12/46* (2013.01)

(58) Field of Classification Search
CPC ..... A01D 75/282; A01F 12/446; A01F 12/34; A01F 12/44; A01F 12/448; Y10S 460/901
See application file for complete search history.

(56) References Cited

U.S. PATENT DOCUMENTS 2,939,581 A * 6/1960 Ashton .................... A01F 12/44
                                                         209/26
3,412,735 A * 11/1968 Bichel .................. A01D 75/282
                                                         209/319
(Continued)

FOREIGN PATENT DOCUMENTS

EP       2145530 A2    1/2010
GB        922907 A     4/1963
(Continued)

OTHER PUBLICATIONS

European Search Report; 16186178.6-1656; dated Jan. 25, 2017.

*Primary Examiner* — Arpad Fabian-Kovacs
(74) *Attorney, Agent, or Firm* — Patrick M. Shetdrake (57) ABSTRACT

An agricultural vehicle includes a chassis; a threshing and separating assembly carried by the chassis; and a cleaning system carried by the chassis and configured to receive crop material that has passed through the threshing and separating assembly. The cleaning system includes a pan configured to receive crop material from the threshing and separating assembly on a pan surface and to shake in a fore-to-aft direction; at least one sieve located below the pan and configured to shake in fore-to-aft and lateral directions, the sieve including a sieve surface configured to receive crop material from the pan; and at least one divider associated with and extending at least 3 centimeters above at least one of the pan surface and the sieve surface.

15 Claims, 5 Drawing Sheets

(56) References Cited

U.S. PATENT DOCUMENTS

| | | | |
|---|---|---|---|
| 3,800,803 A | 4/1974 | Rouse | |
| 3,913,589 A * | 10/1975 | Rouse | A01F 12/44 460/90 |
| 4,875,889 A | 10/1989 | Hagerer et al. | |
| 4,897,071 A | 1/1990 | Desnijder et al. | |
| 5,282,771 A * | 2/1994 | Underwood | A01D 75/282 460/8 |
| 5,338,257 A * | 8/1994 | Underwood | A01D 75/282 460/8 |
| 6,672,957 B2 | 1/2004 | Voss et al. | |
| 6,843,719 B1 * | 1/2005 | Sacquitne | A01D 75/282 460/101 |
| 7,306,513 B2 * | 12/2007 | Mackin | A01D 75/282 460/101 |
| 7,396,278 B2 | 7/2008 | Nelson et al. | |
| 7,946,908 B2 * | 5/2011 | Lobdell | A01D 75/282 209/394 |
| 9,258,945 B2 * | 2/2016 | Pearson | A01F 12/446 |
| 2005/0164755 A1 * | 7/2005 | Nelson | A01D 75/282 460/101 |
| 2005/0282601 A1 * | 12/2005 | Duquesne | A01D 75/282 460/101 |
| 2006/0229119 A1 | 10/2006 | Wamhof et al. | |
| 2007/0123326 A1 | 5/2007 | Mackin et al. | |
| 2014/0179381 A1 * | 6/2014 | Murray | A01D 75/282 460/101 |
| 2015/0080070 A1 | 3/2015 | Johnson et al. | |
| 2015/0087364 A1 * | 3/2015 | Adamson | A01F 12/446 460/79 |
| 2015/0087366 A1 * | 3/2015 | Pearson | A01F 12/34 460/95 |

FOREIGN PATENT DOCUMENTS

| | | |
|---|---|---|
| JP | 2001-112332 A | 4/2001 |
| WO | 2015091034 A1 | 6/2015 |

* cited by examiner

GRAIN PAN AND SIEVE DIVIDERS

CROSS REFERENCE TO RELATED APPLICATIONS

This is a non-provisional application based upon U.S. provisional patent application Ser. No. 62/211,394, entitled "GRAIN PAN AND SIEVE DIVIDERS", filed Aug. 28, 2015, which is incorporated herein by reference.

BACKGROUND OF THE INVENTION

1. Field of the Invention

The present invention relates to agricultural vehicles, and, more particularly, to combine harvesters.

2. Description of the Related Art

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves, often referred to as a chaffer sieve and a shoe sieve, and may also include a pan between the threshing and separating assembly and the cleaning sieves. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. Other systems also exist that can utilize, for example, a loop conveyor system which eliminates the need for a conventional cross auger.

Since the combine is simultaneously collecting and cleaning crop material, the cleaning system can be subjected to changing conditions as the combine navigates a field, affecting the performance of the cleaning system. One particular condition that affects cleaning system performance is when the combine is collecting crop material from a hill or other terrain that is not flat. In such instances, one lateral side of the combine might be angled downwardly with respect to the other lateral side of the combine. This can cause the cleaning system to be similarly angled, with one lateral side of the pan and cleaning sieves being angled downwardly with respect to the other lateral side.

When the pan and/or cleaning sieves are angled in such a way, crop material that is placed on the pan and/or sieves is forced by gravity toward the lateral side that is angled downwardly. This causes the crop material to accumulate on the downward side, which can overwhelm the cleaning sieves' cleaning capacity near the accumulated crop material while leaving other portions of the cleaning sieves with little to no crop material being cleaned and is an inefficient use of the surface area of the cleaning sieves. As the cleaning system optimally functions when crop material is evenly distributed across the effective cleaning surface of the cleaning sieves, evenly distributing crop material on the sieves remains a challenge in designing combine cleaning systems.

One approach to dealing with crop collection and cleaning on an incline is described in U.S. Pat. No. 4,897,071 to Desnijder et al. Desnijder et al. utilize an incline detecting sensor to determine when the machine is on an incline and responsively adjust the lateral tilting of the upper sieve. The configuration taught by Desnijder et al. is commonly referred to as a "self-leveling sieve" system, as the sieve will responsively pivot so the sieve remains a horizontal surface and the crop material does not drift further under the influence of gravity. One limitation to the configuration taught by Desnijder et al. is that the system can only respond to inclination to prevent further crop material drift; the configuration does not correct crop material drift that has already occurred. Further, there can be a lag period between detecting the inclination and responsively adjusting the tilt of the sieve, as well as detecting the machine is back on flat ground and responsively returning the sieve to its original orientation.

What is needed in the art is an agricultural vehicle that allows for more even distribution of crop material to the cleaning sieves when the vehicle is on uneven terrain than known vehicles.

SUMMARY OF THE INVENTION

The present invention provides an agricultural vehicle with a cleaning system including a pan, at least one sieve that can shake in a lateral direction, and at least one divider that extends at least 3 centimeters above a surface of the pan and/or sieve.

The invention in one form is directed to an agricultural vehicle including a chassis; a threshing and separating assembly carried by the chassis; and a cleaning system carried by the chassis and configured to receive crop material that has passed through the threshing and separating assembly. The cleaning system includes a pan configured to receive crop material from the threshing and separating assembly on a pan surface, the pan also being configured to shake in a fore-to-aft direction; at least one sieve located below the pan and configured to shake in fore-to-aft and lateral directions, the sieve including a sieve surface configured to receive crop material from the pan; and at least one divider associated with and extending at least 3 centimeters above at least one of said pan surface and said sieve surface.

The invention in another form is directed to a cleaning system for an agricultural harvester including a pan having a pan surface and being configured to shake in a fore-to-aft direction; at least one sieve located below the pan and configured to shake in fore-to-aft and lateral directions, the sieve including a sieve surface configured to receive crop material from the pan; and at least one divider associated with and extending at least 3 centimeters above at least one of said pan surface and said sieve surface.

An advantage of the present invention is the lateral side shake of the sieve in combination with the divider can more evenly distribute crop material in the cleaning system.

Another advantage is the divider can reduce the amount of lateral shake needed to evenly distribute crop material on the sieves.

Yet another advantage is the reduced lateral shake needed reduces the amount of lateral space needed to shake the sieve.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
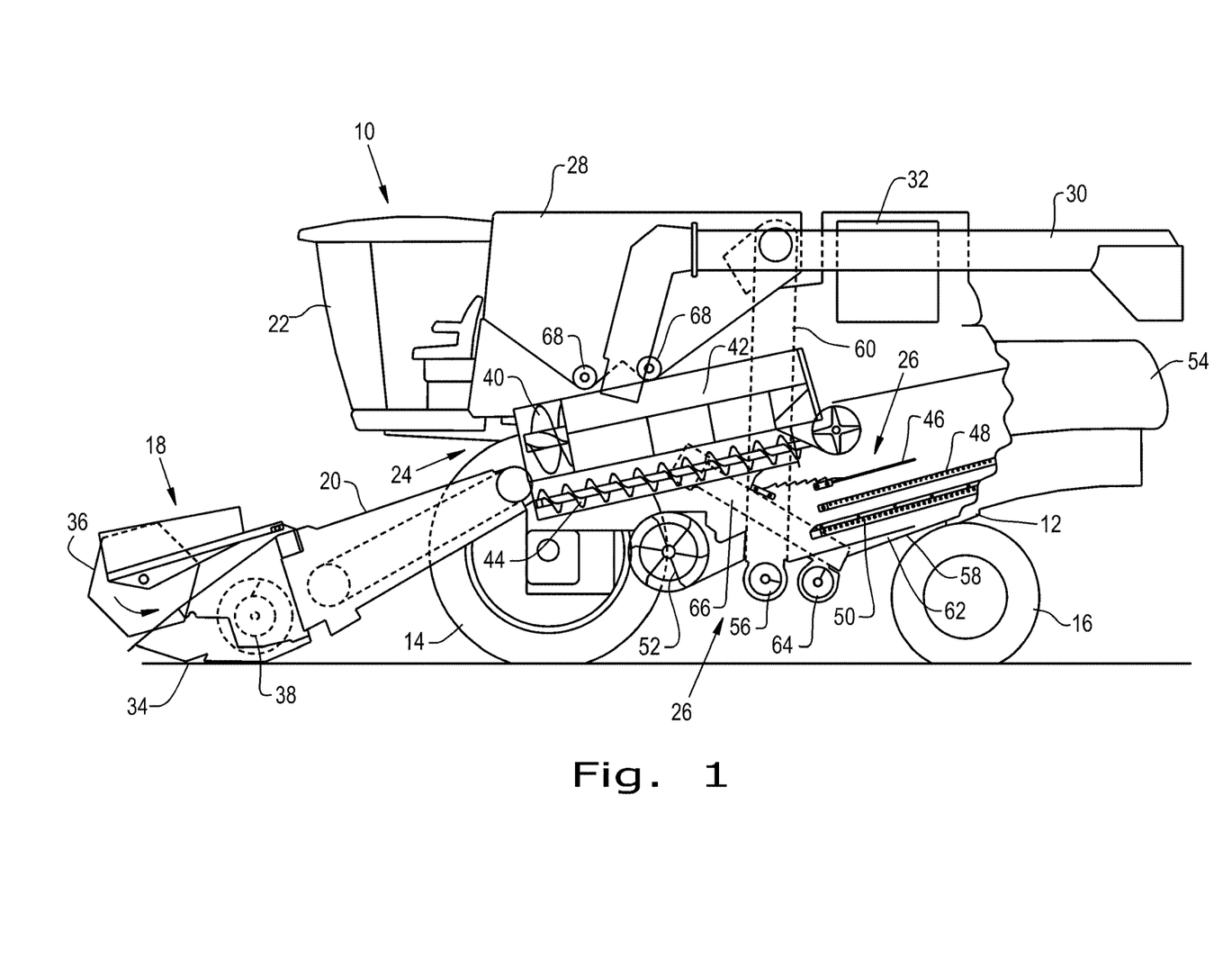
FIG. 1 is a side view of an embodiment of an agricultural vehicle according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. It should be appreciated that while the crop material is described further herein as grain, the agricultural harvester 10 according to the present invention can be used to collect and process any type of crop material.

Grain which has been separated by the threshing and separating assembly 24 falls onto an auger 44 and is conveyed toward cleaning system 26. Cleaning system 26 may include a pan 46, an upper sieve 48 (also known as a chaffer sieve), a lower sieve 50 (also known as a shoe sieve), and a cleaning fan 52. Grain on sieves 48 and 50 is subjected to a cleaning action by fan 52 which provides an airflow through the sieves to remove chaff and other impurities such as dust from the grain by making this material airborne for discharge from straw hood 54 of combine 10. Pan 46 oscillates in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings auger on 58. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

Figure 2:
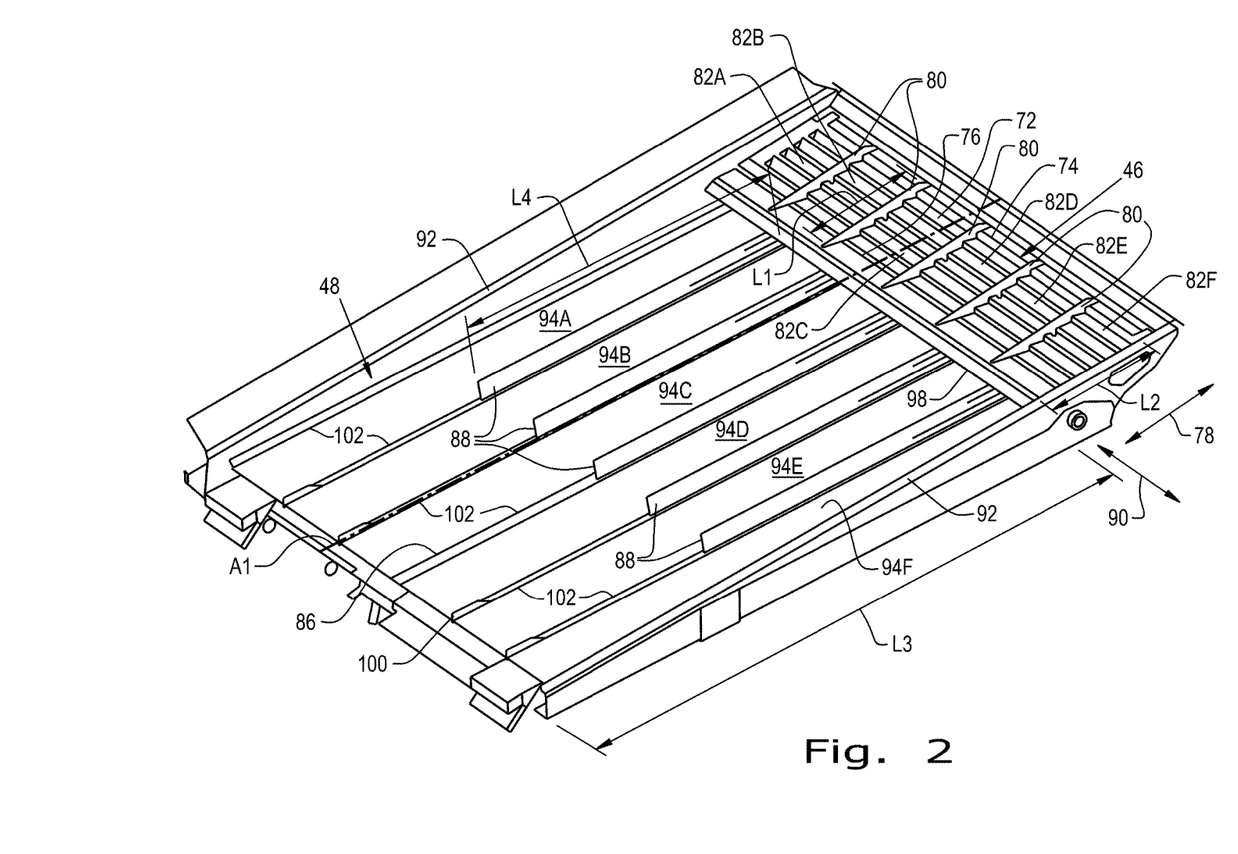
FIG. 2 is a perspective view of a portion of an embodiment of a cleaning system according to the present invention.
Figure 3:
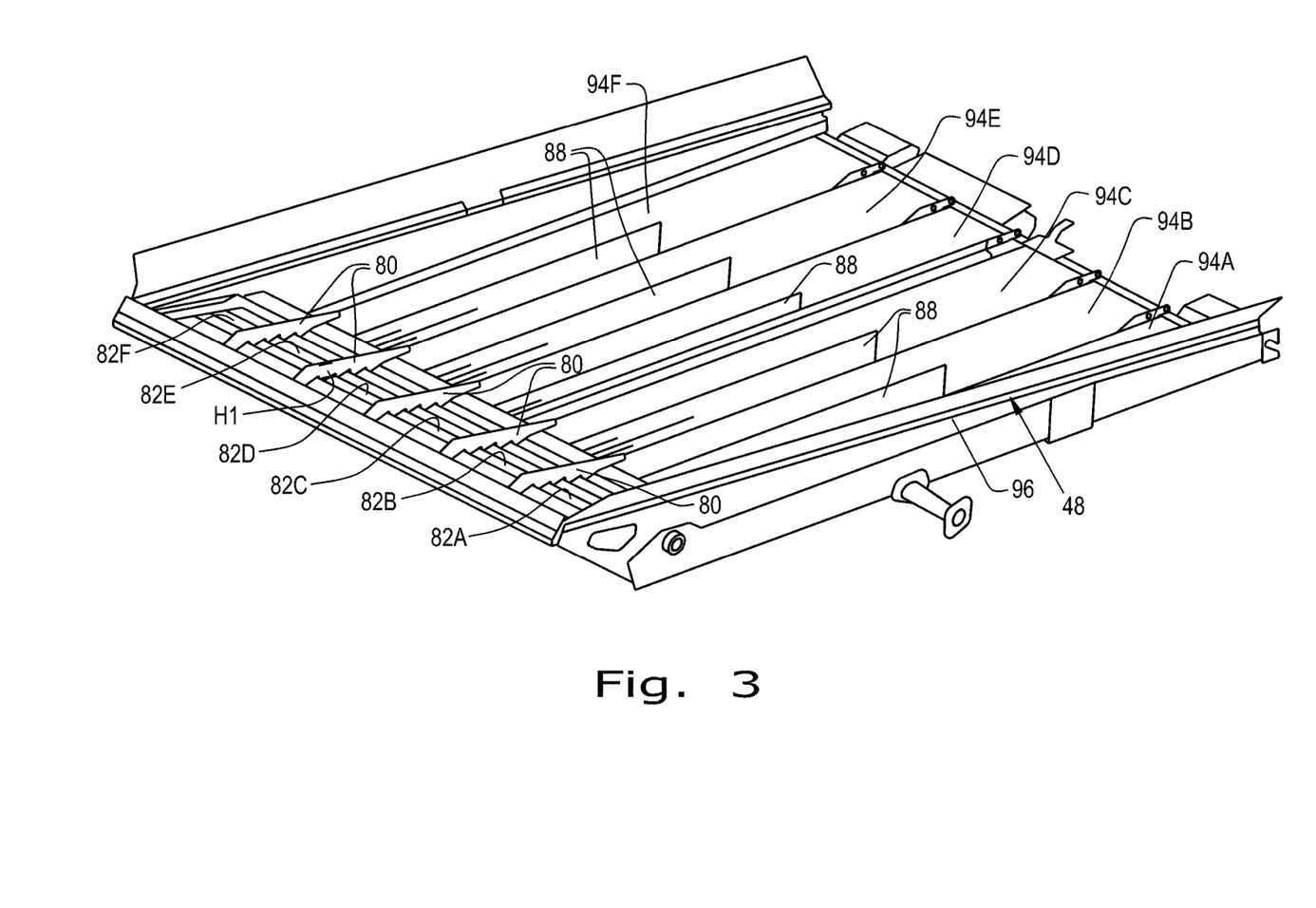
FIG. 3 is another perspective view of the cleaning system shown in FIG. 2.

Referring now to FIGS. 2-3, the pan 46 and upper sieve 48 of the cleaning system 26 are shown. As can be seen, the pan 46 has a pan surface 72 where crop material that has passed through the threshing and separating system 24 is transported via auger 44. The pan 46 is mounted so that crop material is dropped onto the pan surface 72 near a front end 74 of the pan 46 and travels toward a rear end 76 of the pan 46. The pan 46 oscillates in a fore-to-aft direction to advance the crop material toward the upper sieve 48 for cleaning action. As can be seen, the pan surface 72 can have one or more dividers 80, shown as five dividers in FIGS. 2-3, associated with the pan surface 72 that extend 3 centimeters or more above the pan surface 72 to separate the pan 46 into separated regions, shown as 82A, 82B, 82C, 82D, 82E, and 82F. It is contemplated that while the dividers 80 may have a height H1 relative to the pan surface 72 of 3 centimeters, the height H1 of the dividers 80 relative to the pan surface 72 can be significantly higher, such as 20-50 centimeters, if desired. As used herein, the term "associated with" signifies that the dividers 80 are adhered or held close to the pan surface 72 so that the pan surface 72 can be effectively divided into the previously mentioned regions 82A, 82B, 82C, 82D, 82E, and 82F. The dividers 80 can be equally spaced from one another so that the regions 82A, 82B, 82C, 82D, 82E, and 82F are roughly the same size, as shown. The dividers 80 being 3 centimeters above the pan surface 72 helps keep crop material that falls onto the pan surface 72 in the specific region 82A, 82B, 82C, 82D, 82E, or 82F that the crop material falls in, reducing migration of the crop material laterally across the pan surface 72. By reducing lateral migration of the crop material across the pan surface 72, the dividers 80 lessen the effects of downhill slope on the cleaning system 26 since crop material that would normally accumulate toward one of the lateral ends 84 of the pan 46 can be stopped by the dividers 80. Reducing lateral migration of the crop material across the pan surface 72 can allow for a more even distribution of crop material to the upper sieve 48, which can help increase the cleaning efficiency of the upper sieve 48.

The thickness of the dividers 80 can also be adjusted to control how much space on the pan surface 72 that the dividers 80 occupy and how the dividers 80 can be associated with the pan surface 72. For example, if the dividers 80 have a low thickness that makes the dividers 80 flimsy, attaching the dividers 80 to the pan 46 with an adhesive might be the appropriate way to keep the dividers 80 held in place to divide the pan surface 72. While the dividers 80 are shown as extending perpendicularly relative to a plane defined by the pan surface 72, one or more of the dividers 80 can be angled relative to the pan surface 72. The dividers 80 can also define a divider length L1 that is a percentage of or close to a pan length L2 of the pan 46. The divider length L1 can be, for example, approximately equal to the pan length L2 as shown or at least 50% of the pan length L2 to separate only a portion of the pan surface 72 into partitioned regions.

Figure 4:
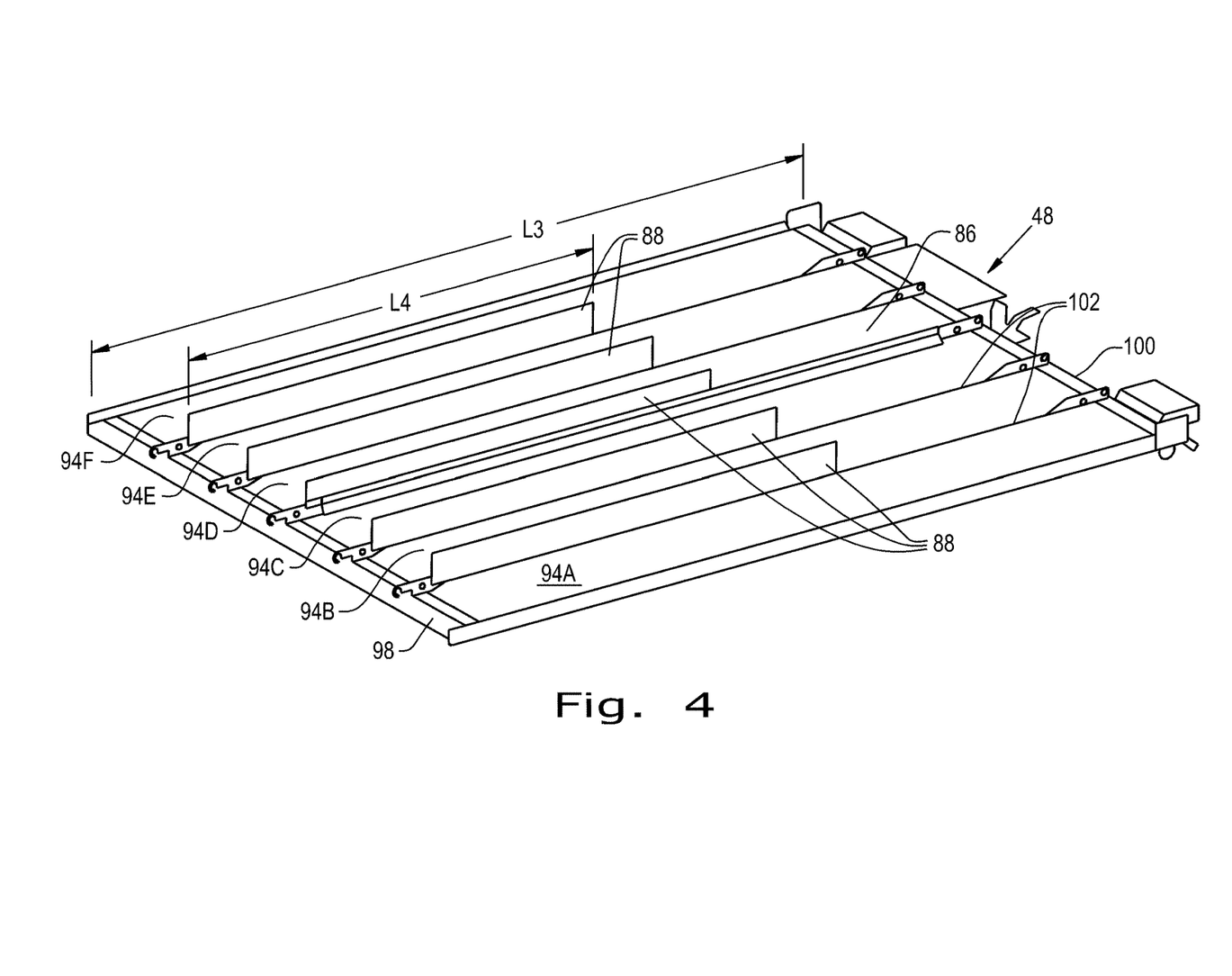
FIG. 4 is a perspective view of an embodiment of a sieve according to the present invention.

Further referring to FIGS. 2-3 and now also referring to FIG. 4, it can be seen that the upper sieve 48 has a sieve surface 86 and can also have dividers 88 associated with and extending at least 3 centimeters above the sieve surface 86. Similar to previously described dividers 80, the dividers 88 can extend significantly more than 3 centimeters above the sieve surface 86. The sieve surface 86 is placed below the pan 46 so that as crop material falls off the pan 46 due to the fore-to-aft motion of the pan 46, the crop material can be dropped onto the sieve surface 86 for cleaning by the upper sieve 48. While the upper sieve 48 is shown in FIGS. 2-4, it should be appreciated that the lower sieve 50 can also have dividers associated with a sieve surface of the lower sieve 50. The upper sieve 48 is configured so that the sieve 48 not only shakes in the fore-to-aft direction 78 similarly to the pan 46, but also in a lateral direction, signified by arrow 90. By shaking the upper sieve 48 in the lateral direction 90 as well as the fore-to-aft direction 78, crop material that falls onto the sieve surface 86 can be re-distributed across the sieve surface 86 when the agricultural vehicle 10 is travelling across a sloped terrain where the crop material will tend to accumulate toward one of the lateral ends 92 of the sieve 48.

Similar to the dividers 80 associated with the pan surface 72, the dividers 88 associated with the sieve surface 86 can divide the sieve surface 86 into separated sieve regions 94A, 94B, 94C, 94D, and 94E. As is known, the upper sieve 48 can be formed as two or more sieve panels that are placed and held adjacent to one another by a sieve frame 96, so that the sieve panels together form the sieve surface 86. In this sense, the separated sieve regions 94A, 94B, 94C, 94D, and 94E can each be a sieve panel with the dividers 88 forming the boundaries between adjacent sieve panels that together form the sieve surface 86. As best seen in FIG. 2, the cleaning system 26 can define a longitudinal axis A1 across a length of the pan 46 and upper sieve 48. The dividers 80 associated with the pan surface 72 and the dividers 88 associated with the sieve surface 86 can be aligned on the longitudinal axis A1 so that the dividers 80 and 88 together form a partially or completely continuous divider that extends along the longitudinal axis A1 of the cleaning system 26. To maintain the continuity of the dividers 80 and 88, the dividers 88 associated with the sieve surface 86 can extend from a front end 98 of the sieve 48, where the sieve 48 is adjacent to the pan 46, toward a rear end 100 of the sieve 48 to be dropped on the lower sieve 50. By forming a partially or completely continuous divider, the distribution of crop material across the pan surface 72 and sieve surface 86 can be mostly maintained at the transition between the pan 46 and the upper sieve 48. To mount the sieve panels 94A, 94B, 94C, 94D, and 94E to the sieve frame 96, the panels 94A, 94B, 94C, 94D, and 94E can be attached to sieve section dividers 102 that stay below the sieve surface 86 so as not to interfere with cleaning action. The dividers 88 can thus be removably attached to the sieve section dividers 102 to keep crop material from laterally migrating between panels 94A, 94B, 94C, 94D, and 94E, allowing the dividers 88 to be easily integrated into the cleaning system 26 or removed if deemed unnecessary. The sieve 48 defines a sieve length L3 and the dividers 88 can have a divider length L4 that is equal to or a percentage of the sieve length L3. As shown, the dividers 88 can have a divider length L4 that is 50% or more of the sieve length L3 so that the dividers 88 separate more than half of the surface area of the sieve surface 86 into regions 94A, 94B, 94C, 94D, and 94E. It is contemplated that the dividers 88 do not need to each have the same divider length and the divider lengths can be greater or less than 50% of the sieve length L3.

By dividing the sieve surface 86 into separated regions 94A, 94B, 94C, 94D, and 94E, the crop material distribution across the sieve surface 86 can be better maintained than just laterally shaking the upper sieve 48. Previously, it was believed that including dividers 88 associated with the sieve surface 88 would negate the need for laterally shaking the sieve surface 86, or vice versa, because the crop material distribution across the sieve surface 86 could be maintained by one mechanism or the other. It has been found that the dividers 88 in combination with shaking the sieve 48 in the lateral direction 90 has a synergistic effect that greatly increases the effectiveness of the side shake. This has been attributed to the amount of crop material accumulation on each region 94A, 94B, 94C, 94D, and 94E being less, so less lateral shake is needed to redistribute the accumulated crop material in each region 94A, 94B, 94C, 94D, and 94E. The dividers 88 also act as barriers to the lateral shake causing excessive lateral crop material migration across the sieve surface 86. Thus, the amount of lateral shake needed to evenly distribute crop material across the sieve surface 86 per degree of inclination can be reduced by 30% or more, depending on the number of dividers 88 that are associated with the sieve surface 86. This reduction in the amount of lateral shake needed not only lowers stress on the shaking components, but reduces the amount of lateral space that the sieve 48 needs to shake in order to provide the necessary shake leading to a reduced space requirement of the sieve 48 in the agricultural vehicle 10.

Figure 5:
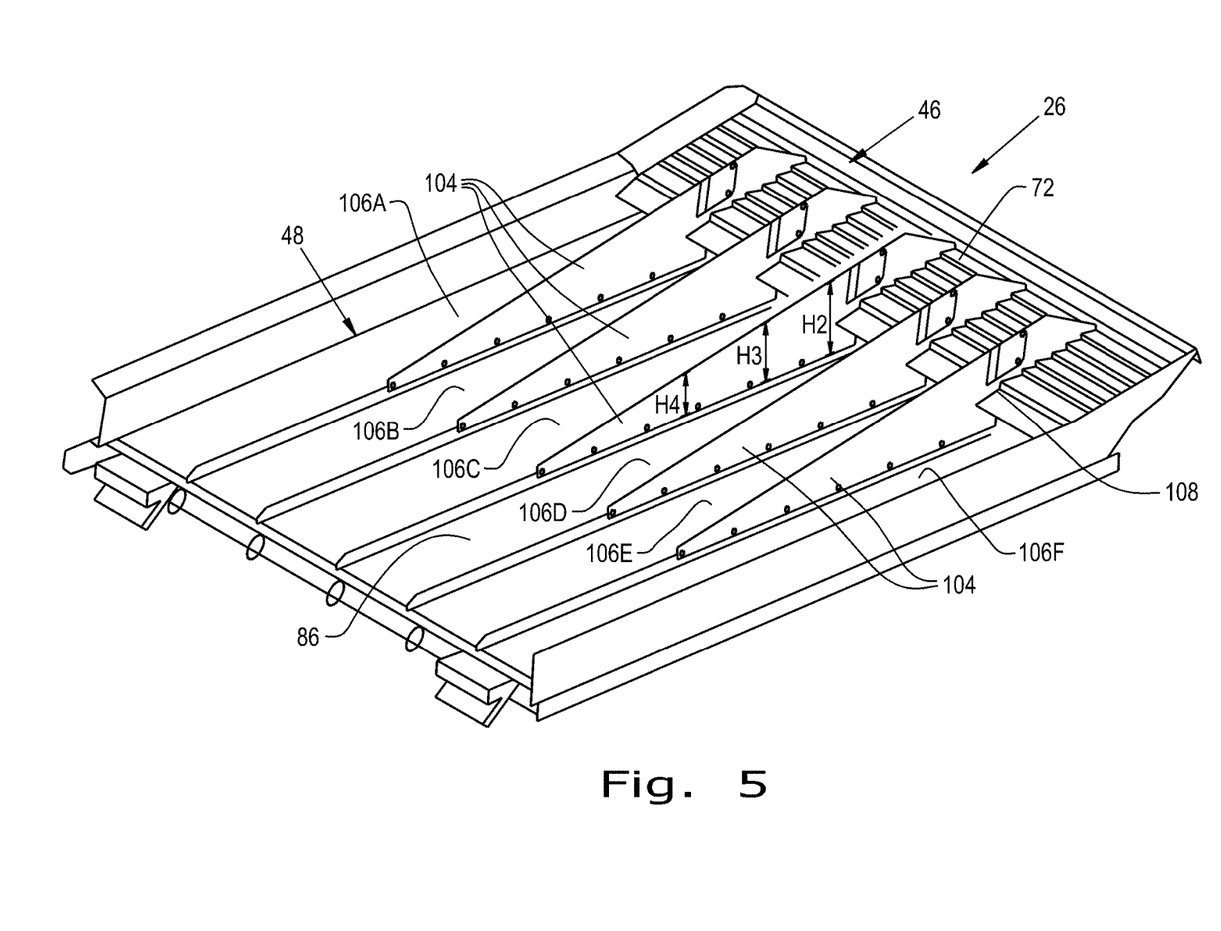
FIG. 5 is a perspective view of another embodiment of a pan and sieve according to the present invention.

Referring now to FIG. 5, the cleaning system 26 is shown with dividers 104 that are associated with and extend above both the pan surface 72 and the sieve surface 86. These dividers 104 can be similar to previously described dividers 80 and 88 in their relative placement and orientation with respect to the pan surface 72 and sieve surface 86, the dividers 104 will just be taller so that the dividers 104 continuously separate both the pan 46 and sieve 48 into regions 106A, 106B, 106C, 106D, 106E, and 106F. Since the pan 46 is above the sieve 48, as shown, the dividers 104 can have a plurality of heights H2, H3, and H4 relative to the sieve surface 86 that decreases from the front end 74 of the pan 46 toward the rear end 100 of the sieve 48, with the smallest height of the dividers 104 relative to the sieve surface 86 being at least 3 centimeters. In this sense, the dividers 104 taper from the front of the cleaning system 26 toward the back. To accommodate the dividers 104, slits 108 can be cut into the dividers 104 to allow the dividers 104 to slide over the pan 46 and be attached to the sieve section dividers 102 to hold the dividers 104 in place. Such a construction can thus reduce the number of dividers that must be connected to the pan 46 and/or sieve 48 and simplify the installation of dividers.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
   a chassis;
   a threshing and separating assembly carried by said chassis; and
   a cleaning system carried by said chassis and configured to receive crop material that has passed through said threshing and separating assembly, said cleaning system including:
      a pan configured to receive crop material from said threshing and separating assembly on a pan surface, said pan configured to shake in a fore-to-aft direction;
      at least one sieve located below said pan and configured to shake in fore-to-aft and lateral directions, said sieve including a sieve surface configured to receive crop material from said pan;
      at least one divider associated with and extending at least 3 centimeters above at least one of said pan surface and said sieve surface; and,
      wherein said at least one divider is associated with and extends above both said pan surface and said sieve surface and defines a divider height that continuously decreases in a direction from adjacent front of said pan surface toward a rear of said sieve surface.

2. The agricultural vehicle according to claim 1, comprising at least one divider associated with and extending above said pan surface and at least one other divider associated with and extending above said sieve surface.

3. The agricultural vehicle according to claim 2, wherein said cleaning system defines a longitudinal axis and said at least one divider and said at least one other divider are aligned on said longitudinal axis.

4. The agricultural vehicle according to claim 1, comprising at least three dividers extending above at least one of said pan surface and said sieve surface, said at least three dividers being equally spaced from one another.

5. The agricultural vehicle according to claim 1, wherein said sieve includes a plurality of sieve, said at least one divider defining a boundary between two adjacent sieve panels.

6. The agricultural vehicle according to claim 5, wherein said sieve frame includes at least one sieve section divider, said at least one divider being removably attached to said at least one sieve section divider.

7. The agricultural vehicle according to claim 1, wherein said pan defines a pan front end and a pan rear end, said sieve defines a sieve front end and a sieve rear end, said at least one divider extending from at least one of said pan front end toward said pan rear end and from said sieve front end toward said sieve rear end.

8. The agricultural vehicle according to claim 1, wherein said sieve is a chaffer sieve and said at least one divider is associated with and extends above said sieve surface.

9. The agricultural vehicle according to claim 1, wherein said pan surface is corrugated and said at least one divider extends above said pan surface.

10. The agricultural vehicle according to claim 1, wherein said at least one divider is associated with and extends above said pan surface and said pan defines a pan length, said at least one divider defining a divider length that is at least 50% of said pan length.

11. The agricultural vehicle according to claim 1, wherein said at least one divider is associated with and extends above said sieve surface and said at least one sieve defines a sieve length, said at least one divider defining a divider length that is at least 50% of said sieve length.

12. The agricultural vehicle according to claim 1, wherein said at least one divider extends at least 10 centimeters above its associated surface.

13. A cleaning system for an agricultural vehicle, comprising:
- a pan having a pan surface and being configured to shake in a fore-to-aft direction;
- at least one sieve located below said pan and configured to shake in fore-to-aft and lateral directions, said sieve including a sieve surface configured to receive crop material from said pan;
- at least one divider associated with and extending at least 3 centimeters above at least one of said pan surface and said sieve surface; and
- wherein said at least one divider is associated with and extends above both said pan surface and said sieve surface and defines a divider height that continuously decreases in a direction from adjacent front of said pan surface toward a rear of said sieve surface.

14. The cleaning system according to claim 13, comprising at least one divider associated with and extending above said pan surface and at least one other divider associated with and extending above said sieve surface.

15. The agricultural vehicle according to claim 14, wherein said cleaning system defines a longitudinal axis and said at least one divider and said at least one other divider are aligned on said longitudinal axis.

* * * * *